Feb. 15, 1966  G. L. EIGENMANN  3,235,436
ROAD MARKING EQUIPMENT
Filed Sept. 11, 1961  4 Sheets-Sheet 1
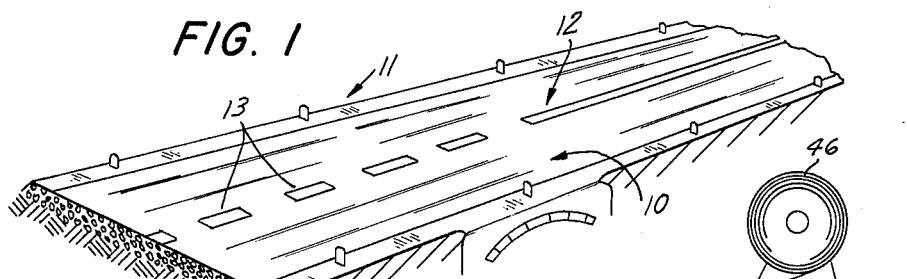
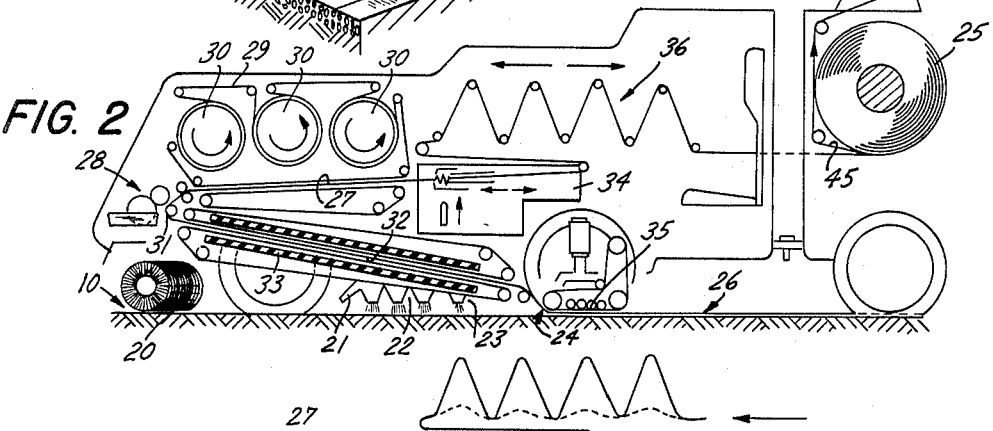
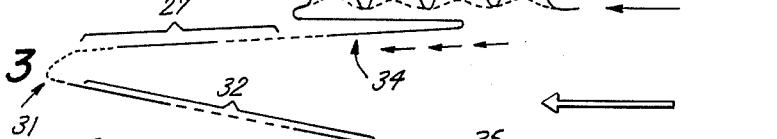
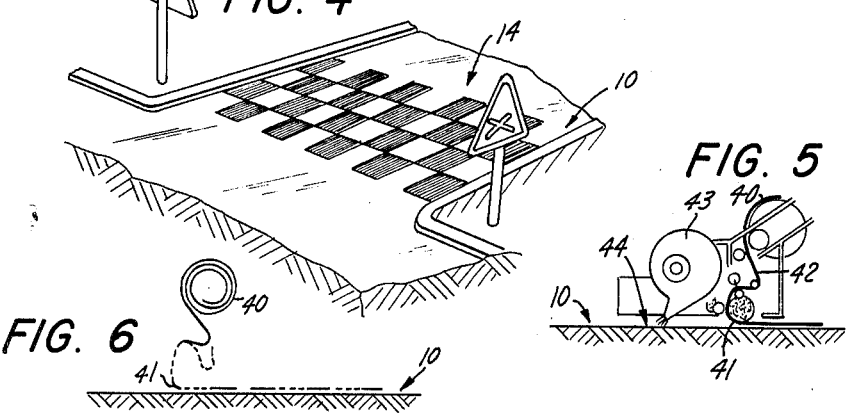
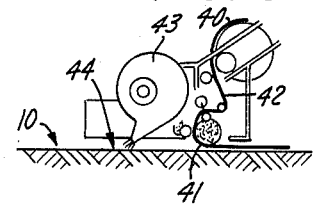
INVENTOR.
Gino Luigi Eigenmann
BY Michael S. Striker

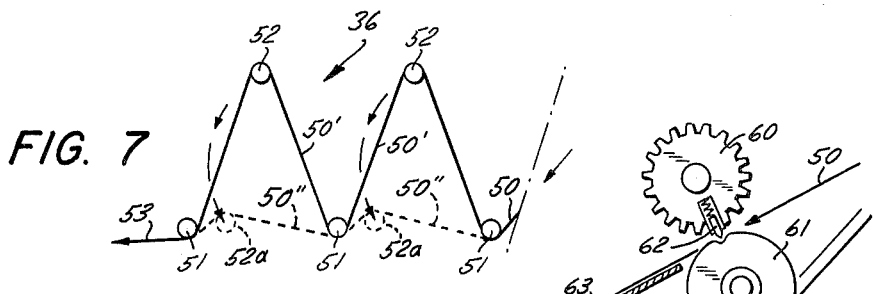
FIG. 7
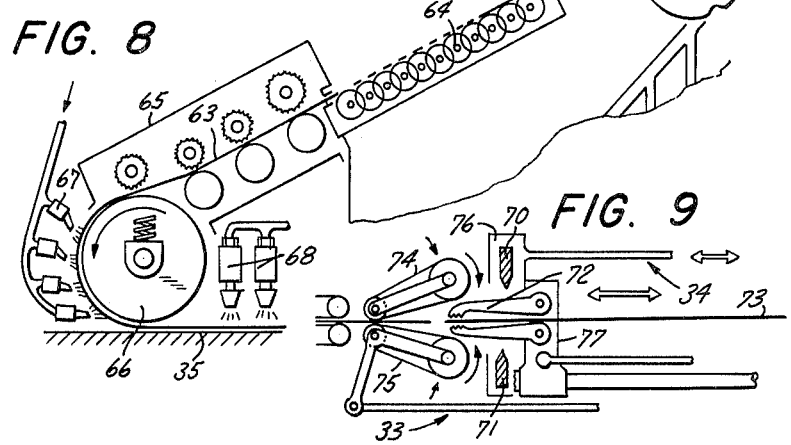
FIG. 8
FIG. 9
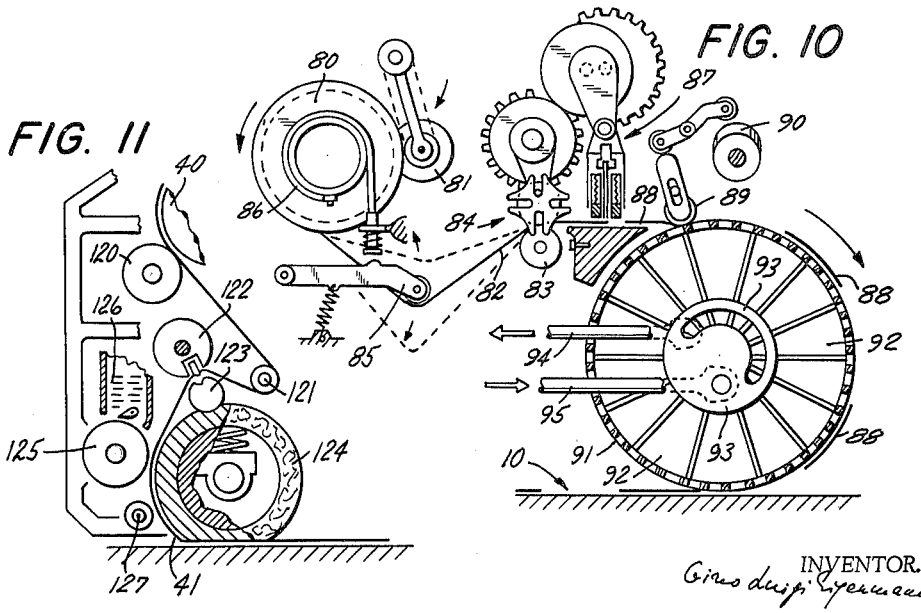
FIG. 10
FIG. 11

FIG. 12
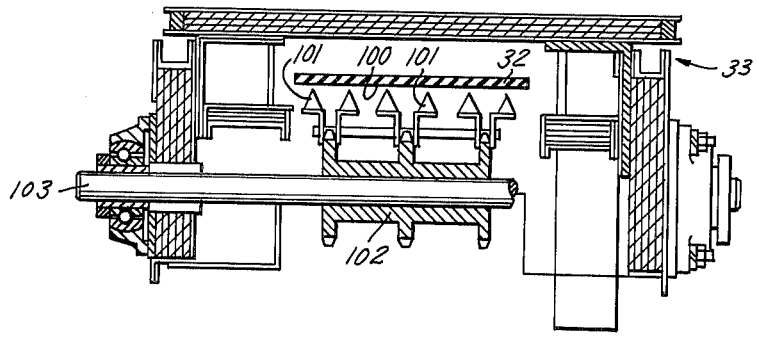
FIG. 13
FIG. 14
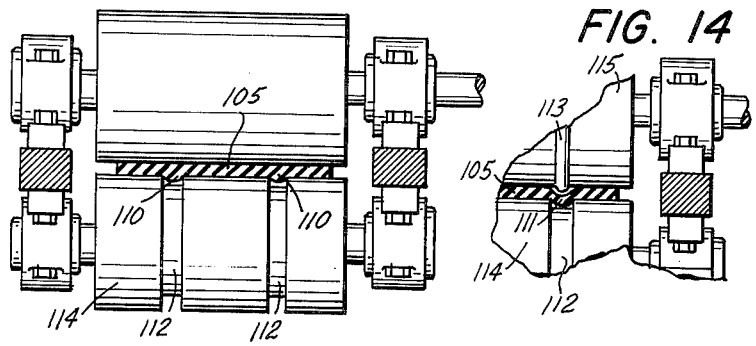
FIG. 15
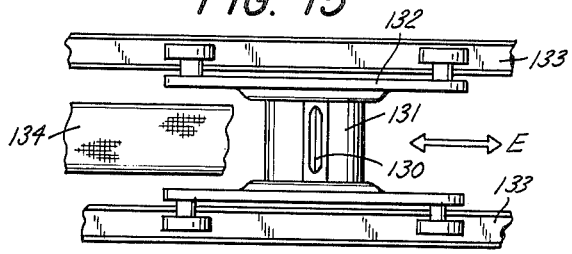
FIG. 16
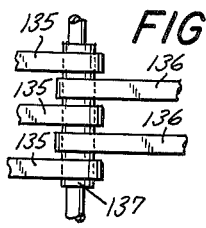
FIG. 17
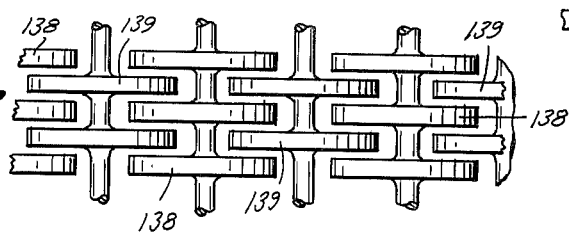

Feb. 15, 1966  G. L. EIGENMANN  3,235,436
ROAD MARKING EQUIPMENT
Filed Sept. 11, 1961  4 Sheets-Sheet 4

INVENTOR.
Gino Luigi Eigenmann
BY
Michael S. Striker
Atty 3,235,436
ROAD MARKING EQUIPMENT
Gino Luigi Eigenmann, 11 Via Spinola, Milan, Italy
Filed Sept. 11, 1961, Ser. No. 137,457
Claims priority, application Switzerland, Sept. 10, 1960,
10,275/60
6 Claims. (Cl. 156—523)

The present invention relates to the art of applying plastic made marking strips and elements to surfaces subject to mark-obliterating traffic, and more particularly to the marking of traffic lines and other directional data upon the pavement of streets or other highways.

Marks of this nature, such as road-center and cross-walks lines, and other traffic aids such as words of warning or stop signals, were customarily painted upon the street or highway pavements with ordinary paint. Since the paint does not dry immediately, it has been necessary heretofore to perform the marking work by roping off the freshly painted areas to eliminate traffic thereover until the paint dries. Such painted marks are not durable and under severe traffic conditions the painted marks are rapidly obliterated by the tires of passing vehicles.

According to a more advanced technique, such marks are made from plastic sheet material adhesively applied to the road surface, and several road marking apparatus designed to lay and adhesively apply to the road surface such sheet mterials have been heretofore proposed. In my prior patent application Serial No. 847,556, filed on October 20, 1959 (now Patent No. 3,007,838), a particularly effective and useful road-marking vehicle has been described. Such a vehicle is adapted to progressively lay and adhesively apply on road and highway surfaces while travelling in the direction defined by the applied marking, lengths of plastic sheet material either in continuous i.e. uninterrupted form, or in interrupted manner, i.e. by successively applying on the road surface spaced lengths of the sheet material.

In actual service of such and other road-marking apparatus, several serious problems and difficulties have been however encountered. In general, a firm and intimate connection of the sheet material to the road surface is very difficult to attain. For proper operation of the known apparatus fairly rigid material is required, and such substantially rigid material is not well suited for the indicated application as it is not sufficiently pliable to adapt itself to the irregular and coarse road surfaces, and to resist to the obliterating effect of heavy traffic.

Greatly better results in view of a really effective and durable road marking have been however attained by using, as road marking sheet material, essentially compounds including plastic polymers, elastic or rubbery polymers or substances, plasticizers, fillers and pigments, and by making use of adhesive agents of compatible and essentially alike character. In my co-pending patent application, filed on the same date as this application, a number of examples of such compounds and adhesives is given, and the improved devices and equipment of this invention are primarily designed for road marking in connection with materials and means of the above character.

In addition, it has been found that an essential and critical prerequisite for having the sheet material rapidly and permanently bonded to the road surface consists in having the adhesive in a condition of very high viscosity on at least one of the two surfaces i.e. the surface of the sheet or the surface of the road. To transport material, having one of its faces covered with a film of adhesive and to apply such film in the above condition on said face and/or on the road surface to be covered involves certain serious problems.

It is therefore an object of this invention to provide new and improved road marking devices and equipment whereby said problems may be solved by properly applying the adhesive while the above requirements may be fully satisfied and by properly bringing said sheet material in contact with the road surface so that by pressing such material for a very brief time against said surface a thorough, intimate and permanent bonding of the material on the road may be obtained.

In consideration of the above outlined particular nature of the sheet material and of its adhesive property further serious problems are to be solved like to properly cut the same in successive lengths of strips to be spacedly applied to the road surface, wherever the nature of certain signs and markings makes spaced application of the strip necessary, or to move such lengths into the apparatus for having the required interval formed therebetween, and to carry within the apparatus said lengths, prior and/or upon application of adhesive to one face thereof, until the position is reached at which the leading end portion of said lengths is finally laid on the road surface.

A further object of this invention is therefore to provide new and advantageous sheet material cutting, spacing, carrying and guiding equipment for road marking apparatus of the character considered, by which the above problems can be satisfactorily solved.

These and other objects and advantages of the invention are in part obvious and in part will be made apparent as this description proceeds, and the features which are believed to be new and characteristic of the invention are in particular set forth in the appended claims. The invention itself, however, both as to its construction and to its mode of operation will be best understood by reference to the following detailed description of preferred forms of embodiment thereof, when considered in conjunction with the accompanying drawings, forming an essential component of this disclosure, and wherein:

FIGURE 1 diagrammatically and perspectively illustrates a typical example of road-marking, applied as rapidly as possible, with little or no interruption of traffic, without preliminary treatment of the road surface and even under unfavourable weather conditions, however without influencing unfavorably a thorough, intimate and permanent binding of the sheet material to said surface;

FIGURE 2 illustrates in a somewhat simplified way an apparatus adapted for road-marking under the above conditions;

FIGURE 3 is a diagram of the path and of the treatment of the sheet material within the apparatus of FIG. 2;

FIGURE 4 diagrammatically and perspectively illustrates another typical example of road-marking, the application of which creates problems and conditions different from those outlined in FIG. 1 and requires smaller equipment than the equipment illustrated in FIG. 2;

FIGURES 5 and 6 illustrate a small and handy apparatus adapted for road-marking operations of the type of FIG. 4;

FIGURE 7 diagrammatically illustrates the operation of a device included in the apparatus of FIG. 2 and appertaining to the sheet material lengths spacing assembly thereof;

FIGURE 8 is an illustration of another somewhat simplified embodiment of the sheet material cutting and lengths spacing assembly;

FIGURE 9 is a simplified illustration of a sheet material cutting and intermittent feeding device of the machine of FIG. 2, such device corresponding to the one shown in my said prior application;

FIGURE 10 is a rather simplified illustration of an apparatus including the device for feeding, cutting, spacing and applying to the road surface the sheet material, the apparatus being designed for road marking as shown in FIG. 4;

FIGURE 11 illustrates the feeding, cutting and applying assembly of the apparatus of FIG. 5;

FIGURE 12 is a cross-sectional view of an assembly of the apparatus as per FIG. 2 showing the carrying means for the material which was treated with the adhesive;

FIGURES 13 and 14 illustrate means for guiding the sheet material along its path within the apparatus of the invention;

FIGURE 15 is a view from above of a device designed to perform either the guiding, the cutting and the lengths spacing of the material;

FIGURES 16 to 21 are views of examples of sheet material carrying means; and

Figure 22:
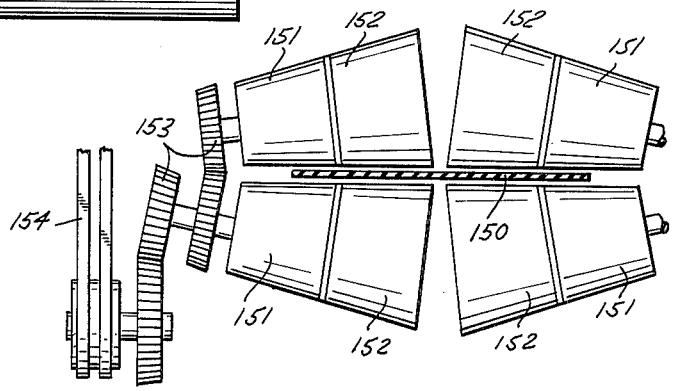

FIGURE 22 is a view of a correcting device for lateral displacement of the material.

Referring first to FIGS. 1 to 6: for better understanding of the objects and of the problems solved by the invention, the following consideration may be kept in mind. For rapidly, safely and permanently applying to the road surface 10 of an highway, such as highway 11 of FIG. 1, or to the surface of a town street, such as illustrated in FIG. 4, the above indicated critical conditions may be satisfied by making use of various means. While for applying extensive uninterrupted road-center lines, such as 12 in FIG. 1, or spaced lengths 13, a rapidly travelling machine is desirable, for the marking of shorter localized traffic aids, such as the cross-walk marking 14 of FIG. 4, a smaller machine which may be easily transported to different locations is preferred, even if such a smaller machine works at a slower pace and less efficiently than the machine designed for permanent application of center lines.

FIGS. 2 and 3 illustrate a machine adapted to travel on the road surface 10 in the direction in which the uninterrupted or interrupted line 12 or 13, respectively (FIG. 1) is to be laid. Such machine includes rotary brush means 20 for cleaning and scrubbing the road surface, a jet 21 of cold or hot air for completing the cleaning, downturned burners 22 for fully drying the road surface and, preferably, a spray-nozzle 23 for applying a very thin film of adhesive to the said surface, preparatory of the laying and application at 24 of the sheet material.

Preferably, the adhesive sprayed by nozzle 23 is of pretty low viscosity, so that it fully penetrates any minor cavity and irregularity of the surface 10. The low viscosity will be increased before the contact with sheet material at 24, due to the partial elimination of the solvents, particularly in consequence of heating of said surface by said burners 22.

The sheet material is carried by the apparatus in the form of an uninterrupted strip wound on a bobbin 25, together with a separating material 45, such as paper or thin sheet plastic not compatible with the marking material, to prevent the sticking beween adjacent coils of the bobbin. Such separating material 45 will be unwound together with the marking material, and wound about another bobbin such as 46. The sheet marking material already applied on the road surface 10, upon the passage of the applying device of the apparatus, is indicated at 26.

The said sheet material may be further carried in the machine and progressively laid on the road surface in form of two or more parallel strips, when desired, for marking road-center twin lines, for example, by duplicating the devices with which the apparatus is provided.

The strip of sheet material, fed at 27 within the apparatus, prior to entering in a device 28 for applying to a face thereof a film of adhesive, is heated by the heat carried by a conveying belt 29 passing about heated rollers 30. Such a heating system is particularly advantageous because the amount of heat transferred into the sheet material at 27 may be exactly limited within the value of heat absorption of said belt 29, of given cross-sectional area and thermal mass.

Upon application of the adhesive to the sheet material at 31, the sheet material travels along a path including a portion 32 in a device generally indicated at 33, wherein by means of heat or of gaseous streams, or other means, the prevailing portion of solvents of the adhesive will be eliminated, so that the adhesive on the sheet material at 24 will possess the said critical very high viscosity. As a consequence thereof, a permanent binding of the material to the road surface, at 26, may be attained by pressing such material on such surface while the apparatus travels for a length 35 of the road.

For providing the laying of sheet material in the form of spaced strip lengths, such as at 13 in FIG. 1, the above described apparatus of FIG. 2 includes a strip cutting and strip length spacing and advancing assembly as generally indicated at 34.

The material from the magazine bobbin 25 is fed into the said assembly 34 through a device 36 wherein the path of such material is caused to be alternatively elongated and shortened, to compensate for intermittent motion of the components of assembly 34, wherein the strip lengths, progressively cut from the uninterrupted strip material from bobbin 25, are lengthwise spaced to be laid on the road surface 10 in the spaced condition illustrated at 13 in FIG. 1.

For providing road markings of the type indicated at 14 in FIG. 4 the simpler machine of FIGS. 5 and 6 is provided with a bobbin 40 acting as a magazine for the sheet material in uninterrupted form. Such material is progressively fed in the position 41 and put in contact with the road surface 10 by an applying and pressing device generally indicated at 42, while a powerful air blower 43 projects a stream of preferably hot air at 44 on the road surface for preparing the same to adhesively bind itself with the sheet material deposited thereon.

According to the showing of FIG. 2 the strip of sheet material is cut in successive lengths of material in the assembly 34 from which the cut lengths are fed in spaced relationship at 27. Therefore the said strip material must be intermittently fed into said assembly 34. Such feeding is made possible by the other device generally indicated at 36, whose operation of which may be readily understood from a consideration of FIG. 7. The strip fed at 50 in said device 36 is caused to alternatively pass about stationary rollers 51 and movable rollers 52 which may be reciprocatingly moved to the positions indicated at 52a. Upon such reciprocation of movable rollers, the sheet material is caused to travel along a path which alternatively becames longer and shorter, as indicated at 50′ and at 50″, respectively.

Assuming that the material is fed at 50 at constant linear speed, the speed at which the same material is discharged at 53 will cyclically vary, and more particularly it will be increased as the amplitude of path of the material is decreased from 50′ to 50″, and respectively decreased and preferably made null as the said amplitude is being increased from 50″ to 50′. During the speed decreasing or nullifying steps, the cut length of material will be spaced from the following leading edge of the strip material, while in the other steps a new length of material will be fed in the cutting device and then carried on to be processed in the further devices and assemblies of the apparatus.

The said cutting device is diagrammatically shown in FIG. 9. It includes oppositely arranged cutting blades 70 and 71 and pincers means 72 to cyclically cut and feed lengths of strip material in the bit of rotating and reciprocatable conveying belt means 74 and 75, while the said blades and pincers are supported by lengthwise movable structure frames generally indicated at 76 and 77, respectively, for reciprocation thereof in phase relationship with the other devices and means. This latter device is more detailedly shown and described in my said prior application filed October 20, 1959 and, therefore, no further explanation and discussion thereof is believed to be necessary herein.

According to another form or embodiment of the invention, which has been proved with very satisfactory results, the strip material is fed at substantially constant speed into the cutting device and the successively cut lengths of material are then accelerated for proper spacing prior to depositing on the road surface. An example of such an embodiment is shown in FIG. 8. As shown in said FIG. 8, the material fed at 50, as it is unwound from a bobbin at 25 in FIG. 2, is cyclically cut into lengths 63, preferably by means of a cutting blade 62 supported by a rotary member 60 and operating in opposition to a rotary center-member 61. The said lengths 63 are fed outside said cutting device at same uniform linear speed at which the same were fed thereinto, and then are caused to travel on an acceleration device 64 which consists of a plane, preferably downwardly inclined as shown, which is longer than the said lengths, and on which said lengths can freely slide, preferably running over a plurality of idler rollers or pulleys.

At the outlet end portion of said acceleration device is located a material pulling device 65 wherein the said lengths 63 are pulled pulling means, such as a pularlity of pairs of plain or toothed rollers, at the greater linear speed required for properly spacing the adjacent lengths from each other. Substantially, such assembly of FIG. 8 includes a speed variation material supporting structure whereon the linear speed of the cut length of material can be freely modified during the path thereof with the road making apparatus.

The said acceleration or variation of speed is as to impart to the lengths a linear speed corresponding to the speed at which the said apparatus travels on the road surface, thereby the said lengths may be transferred from the lengths pulling device to the material laying device, exemplified by roller 66 in FIG. 8, while pressurized air jets 67 force the material about and under the said roller. Further jets 68 press the sheet material laid at 35 on the road surface 10.

The above described structure of FIG. 8 may be further advantageously made use of for processing strip material already provided with a film on the face thereof, designed to contact the road surface when laid thereon. In fact, it will be readily understood from FIG. 8 that the upper face of material fed at 50 under the action of the rotary blade 62 and of the cut lengths 63 running over the acceleration device at 64 could be properly covered by a film of adhesive, which would not be spoiled or otherwise influenced either by the toothed surface of the upper rollers of the pairs of roller means in the pulling device at 65 or by the blasts ejected by jets 57. Such feature is of great interest because it permits the application of the adhesive to the uninterrupted strip and thus facilitates the comparatively simple continuous application of the adhesive.

The construction of FIG. 10 may be advantageously made use of in relation with cross-walk markings application and corresponding road marking work. Such mechanism includes a feeder bobbin 80 braked by a braking device at 86 and from which the continuous strip of material is progressively unwound by an unwinding roller 81 at a substantially constant linear speed. The said strip is fed at 82 at variable speed by pulling rollers 83 intermittently driven by a known device generally indicated at 84. The variations of speed of the material in respect to the said constant speed are made possible by the variations of the path of the material from the bobbin 80 and the pulling rollers, due to the reciprocation of the idler roller supported by a pivotable brace 85.

The intermittently fed material at the outlet of the pulling means is cyclically cut into successive lengths 88 of material by a reciprocated cutting device 87, and said lengths, suitably spaced one from the next under the effect of said intermittent pull, are transferred on the perforated cylindrical surface 91 of a material laying drum. The transfer of the said lengths 88 on the drum is performed by a rotating roller 89 which simultaneously acts as applicating roller for the adhesive and which is cyclically raised from its operative position by a device including a rotary cam 90, for example, phased with passages of the spacings between the said lengths 88.

The interior of said drum is divided into a plurality of sectors 92 which are alternatively and phasedly connected by a rotary distributor 93 to ducts 94 and 95, connected to a source of vacuum and a source of pressurized air (not shown) respectively. The said lengths 88 are thereby caused to be kept on the surface 91 of said drum until in contact with the road surface 10 and then to be forcedly detached from said surface 91 and properly laid and pressed on the road surface.

A simpler device adapted for use in relation with a small and handy apparatus such as shown in FIG. 5 is shown in FIG. 11, wherein the strip material after being unwound from a bobbin 40 by an unwinding roller 120 passes about a reciprocatable roller 121 (which is supported, moved and operated as the idler roller supported by brace 85 in FIG. 10) and is subsequently cut into lengths by a rotary blade means at 122 opposite an anvil roller 123, when required. The uninterrupted strip or the strip lengths is or respectively are transferred about an applying roller coated with a resilient layer 124 for laying thereof at 41 on the road surface. While passing on the front arc portion of said applying roller, the material is contacted by an adhesive applying roller 125 which is in contact with an adhesive 126, preferably of high velocity. A roller 127, or a plurality of rollers, and/or air blasts emitting nozzles, such as indicated at 67 in FIG. 8, are provided for forcing the material under the said applying roller and for increasing the viscosity of the adhesive, if desired, by promoting the prompt elimination of the solvents.

In the above described apparatus, in particular of the type of FIG. 2, the plastic material is caused to travel along a noticeably extended path within the machine. In view of the plasticity, resiliency, and substantial adhesiveness of the materials of the character considered above, certain particular conditions are to be satisfied during the motion of the material, especially when cut in spaced lengths, for guiding supporting and transferring said material from the magazine bobbin into the position where it is laid on the road surface. In particular, the film of adhesive applied to a face of said material, if any, must be carefully saved.

FIG. 12 illustrates the means provided for carrying the material 32, having a lower face 100 provided with a film of adhesive, along the assembly 33 of the apparatus of FIG. 2, where the viscosity of such adhesive is increased either by heating and/or by the impact of a cold or a heated gaseous medium. Such means include a plurality of pointed supporting elements 101 carried by an endless chain supported and driven by sprockets 102 connected to shafts 103. Side displacement of the strip material may be prevented by providing such material with one or more longitudinal grooves or ribs, and by guiding such grooves or ribs by matingly ribbed or grooved pulleys or rollers. According to FIG. 13 the material 105 is provided with longitudinal ribs 110 guided in grooves 112 of a conveying roller 114. In FIG. 14 there is shown a sheet formed with a rib and a groove at 111 and being guided between a roller 114 grooved at 112 and a counter-roller 115 ribbed at 113. The said material could also be provided with a plurality of lengthwise aligned perforations mating with the teeth of toothed guiding and driving pulleys or rollers, whereby said material would be driven and guided along its path substantially as a movie film is in a camera or a projector.

In FIG. 15 an arrangement is shown in which a strip of material 134 (shown in fragmentary view) is intermittently driven, cyclically cut into lengths and laterally guided by a device including a cutting blade 130 carried by a rotating drum 131 provided with guiding flanks and rotatable on a trolley 132 phasedly reciprocated on rails 133 at a linear speed corresponding to the linear speed of the surface of said rotating drum 131, so that an action corresponding to the action of mechanism of FIG. 9 may be attained.

To prevent the supported and driven plastic sheet material to adhere to the surface of the elements designed to support and transfer said material within the apparatus, the supporting member must contact the material in successively varied positions. I have found that this is not only preferable but in some instances absolutely essential. FIGS. 16 and 17 illustrate examples of material supporting and driving means which satisfy the above important requirement.

While carried on by the driving means of FIG. 16, for example, the sheet material is caused to alternatively pass on conveying belts 135 and 136, respectively, having common rollers at 137, so that the portions of the surface of said material, contacting the supporting and driving means, are alternatively substituted. According to FIG. 17, the supporting and driving means are embodied in alternatively arranged pluralities of narrow roller means or pulleys 138 and 139.

Figure 18:
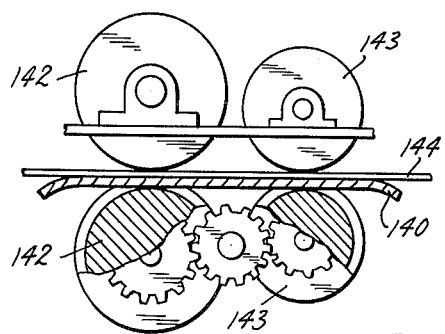
Figure 19:
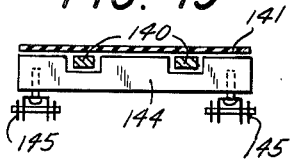

Combinations of rolling means and of sliding means and/or of linearly translating means might be usefully used too for guiding and carrying the material along its path within the aparatus. In FIG. 18 slide rails 140 support and longitudinally guide the material 141 while pairs of driven rollers 142 and 143 cause the same material to travel along its path. Such a combination prevents the leading end portions of material lengths to curl about the driving rollers. In FIG. 19 there are shown, in crosssectional view, like slide rails 140 combined with linearly travelling driving means, such as cross rods 144 (only one of which is shown) spacedly carried on by endless conveying chains 145.

Figure 20:
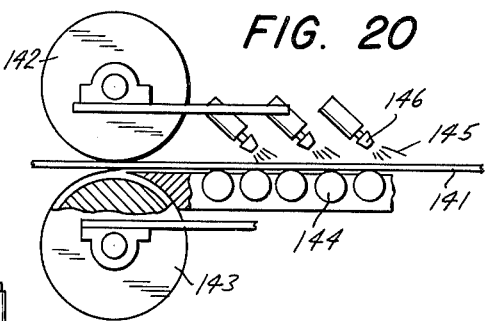
Figure 21:
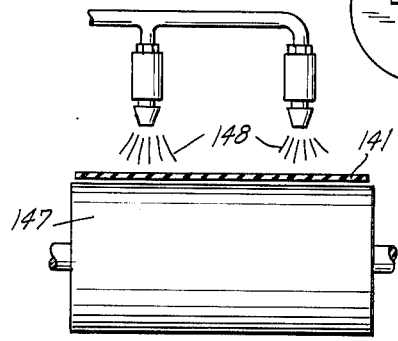

Further, combinations of stationary and/or rotary or linearly moving material supporting and driving bodies and of properly directed blasts of pressurized gaseous media may be advantageously used for forcibly guiding said material along its path within the apparatus. In FIG. 20 there is shown a material 141 driven on by the above proposed roller means 142 and 143, supported by bodies 144 and kept flat and aligned on said supporting means by blasts 145 of pressurized air, for example, ejected from nozzles 146 preferably inclined, as shown, in the direction in which the material is caused to travel. In FIG. 21 there is shown the material 141 pressed against and kept in frictional relationship with the supporting and driving bodies, such as roller 147, by air blasts 148.

To promptly correct lateral deviation of the material in respect to the desired path thereof, along said path within the apparatus one or more deviation correcting devices as shown in FIG. 22, may be used. Such a device guides the acts on material 150 by means of counter-rotating pairs of frusto-conical rollers 151 and 152, driven by a suitable transmission, such as gear means 153 and belt means 154.

While the invention has been described and shown in a defined number of forms of embodiment thereof, it is obvious that the invention itself is not limited to the very details shown, and that several further structural modifications and variations might be made thereto, according to the art.

It is moreover believed to be evident that the present invention includes a plurality of advantageous features, and it will be understood that each of the new features described and any combination thereof may find useful application in other constructions of road marking apparatus, device, appliance and means, differing from the ones described.

Without further analysis, the foregoing will so fully reveal the gist of this invention that others can, by applying current knowledge, readily adapt it for various applications without omitting features that, from the standpoint of the prior art, fairly constitute essental characteristics of this invention and, therefore, such adaptations should and are comprehended within the spirit, meaning, and equivalence of the invention, as defined in and by the appended claims.

Having thus described the invention and the mode of carrying out thereof, what is claimed as new and desired to be protected by Letters Patent is:

In the claims:

1. In a road marking apparatus for applying to a road surface sections of strip material in longitudinally spaced relationship from a vehicle, in combination, means for moving said vehicle at a given speed; supply means on said vehicle for supplying strip material at a predetermined speed lower than said given speed; first feeding means on said vehicle for intermittently feeding said strip material from said supply means to a cutting station located on said vehicle and at a speed greater than said predetermined speed; cutting means on said vehicle located at said cutting station for intermittently cutting said intermittently fed strip material at the end of each intermittent feeding period into strip sections; and second feeding means on said vehicle continuously moving at a speed greater than said predetermined speed for first intermittently receiving said cut strip sections from said cutting station so as to longitudinally spaced said cut strip sections at said given speed onto the road surface.

2. The combination set forth in claim 1, further comprising means for applying a film of high viscosity adhesive to a selected surface of said strip material at a location of said apparatus intermediate said supply means and the position of application of said longitudinally spaced cut strip sections onto the road surface; and pressing means for yieldably pressing said material on said road surface at the position of application for a time sufficient to enable substantial setting of said high viscosity adhesive.

3. The combination set forth in claim 2, wherein said first feeding means comprise roller means engaging said strip material and arranging to be moved into position for alternately increasing and decreasing the length of strip material located between said supply means and said cutting station so that said strip material fed from said supply means at said predetermined speed is fed intermittently to said cutting station at a speed greater than said predetermined speed, said roller means being arranged to alternately accumulate and discharge said strip material.

4. The combination set forth in claim 3, wherein said roller means include at least one pair of rollers abutting one face of said strip material and at least one additional roller intermediate said pair of rollers and abutting the opposite face of said strip material, at least one of said rollers being movable in a direction toward and away from the respective face of said strip material and substantially transversely thereto, all of said rollers remaining in abutment with the respective face of said strip material during said movement so that the length of said strip material between said supply means and said cutting station is reduced and increased respectively.

5. The combination set forth in claim 2, wherein said first feeding means comprise a pivotally mounted roller engaging said strip material and arranged to pivot in a direction substantially transverse to the face of said strip material to alternately increase and reduce the length of strip material between said supply means and said cutting station.

6. The combination set forth in claim 2 wherein said second feeding means comprises free-wheeling roller means for supporting said cut strip sections, said free wheeling roller means forming an inclined free-wheeling surface for intermittently receiving said cut strip sections from said cutting station and for imparting an acceleration to said cut strip sections so that they are longitudinally spaced from each other.

References Cited by the Examiner

UNITED STATES PATENTS

| | | | |
|---|---|---|---|
| 2,261,971 | 11/1941 | Matthews | 271—74 |
| 2,261,972 | 11/1941 | Matthews | 271—74 |
| 2,805,858 | 9/1957 | Hayes | 270—74 |
| 2,952,299 | 9/1960 | Finke | 156—510 |
| 2,973,798 | 3/1961 | Powell | 156—510 |
| 3,007,838 | 11/1961 | Eigenmann | 156—526 |

EARL M. BERGERT, *Primary Examiner.*

R. I. SMITH, M. L. KATZ, *Assistant Examiners.*